US010728600B2

(12) United States Patent
Li et al.

(10) Patent No.: US 10,728,600 B2
(45) Date of Patent: *Jul. 28, 2020

(54) CHANNEL CHANGE SERVER ALLOCATION

(71) Applicant: AT&T INTELLECTUAL PROPERTY I, L.P., Atlanta, GA (US)

(72) Inventors: Quan Li, Cumming, GA (US); Gregory Cooke, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/028,161

(22) Filed: Jul. 5, 2018

(65) Prior Publication Data

US 2018/0332329 A1    Nov. 15, 2018

Related U.S. Application Data

(63) Continuation of application No. 15/416,123, filed on Jan. 26, 2017, now Pat. No. 10,045,059, which is a
(Continued)

(51) Int. Cl.
*H04N 21/262* (2011.01)
*H04N 21/222* (2011.01)
(Continued)

(52) U.S. Cl.
CPC ......... *H04N 21/26283* (2013.01); *G06N 3/08* (2013.01); *G06N 20/00* (2019.01);
(Continued)

(58) Field of Classification Search
None
See application file for complete search history.

(56) References Cited

U.S. PATENT DOCUMENTS 5,884,037 A    3/1999  Aras et al.
6,078,946 A    6/2000  Johnson
(Continued)

FOREIGN PATENT DOCUMENTS

WO    9944335 A2    9/1999
WO    0225452 A2    3/2002
(Continued)

OTHER PUBLICATIONS

Tsai, et al., Variable selection by association rules for customer churn prediction of multimedia on demand. Expert Systems with Applications (2009), doi:10.1016/j.eswa.2009.06.076, 10 pp.
(Continued)

*Primary Examiner* — Justin E Shepard
(74) *Attorney, Agent, or Firm* — Guntin & Gust, PLC; Douglas Robert Schnabel

(57) ABSTRACT

A method includes sending, from a server to a network device, a request for channel change server data, the request identifying a time slot. The method includes receiving, at the server, the channel change server data from the network device responsive to the request. The channel change server data identifies a set of times during the time slot and an estimated number of active channel change servers for each time of the set of times. The method also includes, in response to a first particular estimated number for a first particular time of the set to times indicating to increase a number of active channel change servers, sending an activation command from the server to a first idle channel change server at a first time before the first particular time. The activation command instructs the first idle channel change server to transition to an active channel change server.

20 Claims, 3 Drawing Sheets

Related U.S. Application Data continuation of application No. 14/973,288, filed on Dec. 17, 2015, now Pat. No. 9,578,362.

(51) Int. Cl.

| | | |
|---|---|---|
| *H04N 21/2385* | (2011.01) | |
| *H04N 21/25* | (2011.01) | |
| *G06N 20/00* | (2019.01) | |
| *H04N 21/231* | (2011.01) | |
| *H04N 21/438* | (2011.01) | |
| *G06N 3/08* | (2006.01) | |

(52) U.S. Cl.
CPC ....... *H04N 21/222* (2013.01); *H04N 21/2385* (2013.01); *H04N 21/23103* (2013.01); *H04N 21/23116* (2013.01); *H04N 21/251* (2013.01); *H04N 21/4384* (2013.01)

(56) References Cited

U.S. PATENT DOCUMENTS

| | | | |
|---|---|---|---|
| 6,125,105 A | 9/2000 | Edwards et al. | |
| 6,404,738 B1 | 6/2002 | Reininger et al. | |
| 6,947,378 B2 | 9/2005 | Wu et al. | |
| 7,076,552 B2 | 7/2006 | Mandato | |
| 7,089,217 B2 | 8/2006 | Kasabov | |
| 7,263,069 B2 | 8/2007 | Yegenoglu | |
| 7,450,561 B2 | 11/2008 | Strater et al. | |
| 7,890,552 B2 | 2/2011 | Reichman | |
| 7,957,417 B2 | 6/2011 | Mckinnon, III et al. | |
| 8,015,289 B2 | 9/2011 | Hill et al. | |
| 8,041,797 B2 | 10/2011 | Childress et al. | |
| 8,046,462 B2 | 10/2011 | Trappeniers et al. | |
| 8,108,243 B2 | 1/2012 | Solotorevsky et al. | |
| 8,468,041 B1 | 6/2013 | Vengerov | |
| 8,601,483 B2 | 12/2013 | He et al. | |
| 8,787,181 B2 | 7/2014 | Gaal et al. | |
| 8,796,528 B2 | 8/2014 | Uehara et al. | |
| 8,886,807 B2 | 11/2014 | Nguyen et al. | |
| 8,914,530 B2 | 12/2014 | Josa et al. | |
| 2002/0133587 A1 | 9/2002 | Ensel et al. | |
| 2015/0012593 A1 | 1/2015 | Phillips et al. | |

FOREIGN PATENT DOCUMENTS

| | | |
|---|---|---|
| WO | 2009043291 A1 | 4/2009 |
| WO | 2010026391 A1 | 3/2010 |
| WO | 2015090379 A1 | 6/2015 |

OTHER PUBLICATIONS

Kim, et al., "QoE-Aware Dynamic Bandwidth Allocation Optimization for Mobile IPTV Service Over Heterogeneous Networks", 2011 IEEE International Conference on ICT Convergence (ICTC), 2011, 2 pp.

Fu, et al., "A Neural Network Based Transcoder for MPEG2 Video Compression", Proceedings from the 1999 IEEE International Conference on Acoustics, Speech, and Signal Processing, 1999, 4 pp.

CHANNEL CHANGE SERVER ALLOCATION

PRIORITY CLAIM

This application claims priority from, and is a continuation of, U.S. patent application Ser. No. 15/416,123, filed on Jan. 26, 2017, which is a continuation of U.S. patent application Ser. No. 14/973,288, filed on Dec. 17, 2015, now U.S. Pat. No. 9,578,362, each of which is incorporated herein by reference in its entirety.

FIELD OF THE DISCLOSURE

The present disclosure is generally related to channel change server allocation.

BACKGROUND

A media content distribution system associated with a service provider may provide media content to media devices associated with subscribers. Active channel change servers (e.g., distribution servers or "D-servers") of the media content distribution system receive media content from content sources and provide initial content to media devices associated with subscribers when channel change requests are received from media devices. A channel change request may be received when a media device and/or a display device coupled to the media device is turned on (e.g., a television), when user input received at the media device via a remote control or other control device indicates a channel change, when a personal video recorder associated with the media device requests a media stream to record, when user input received at the media device requests a picture-in-picture view, based on other input, or combinations thereof. The initial content sent to the media device in response to the channel change request may reduce a time to fill a buffer of the media device. Reducing the time to fill the buffer may enable a fast channel change (e.g., enabling display media content of a requested channel in less than one second) so that the media device can quickly begin playback of the requested media content. After receiving the initial content, the media device may receive the media content from another media server (e.g., an allocation server or A-server).

DETAILED DESCRIPTION

Figure 1:
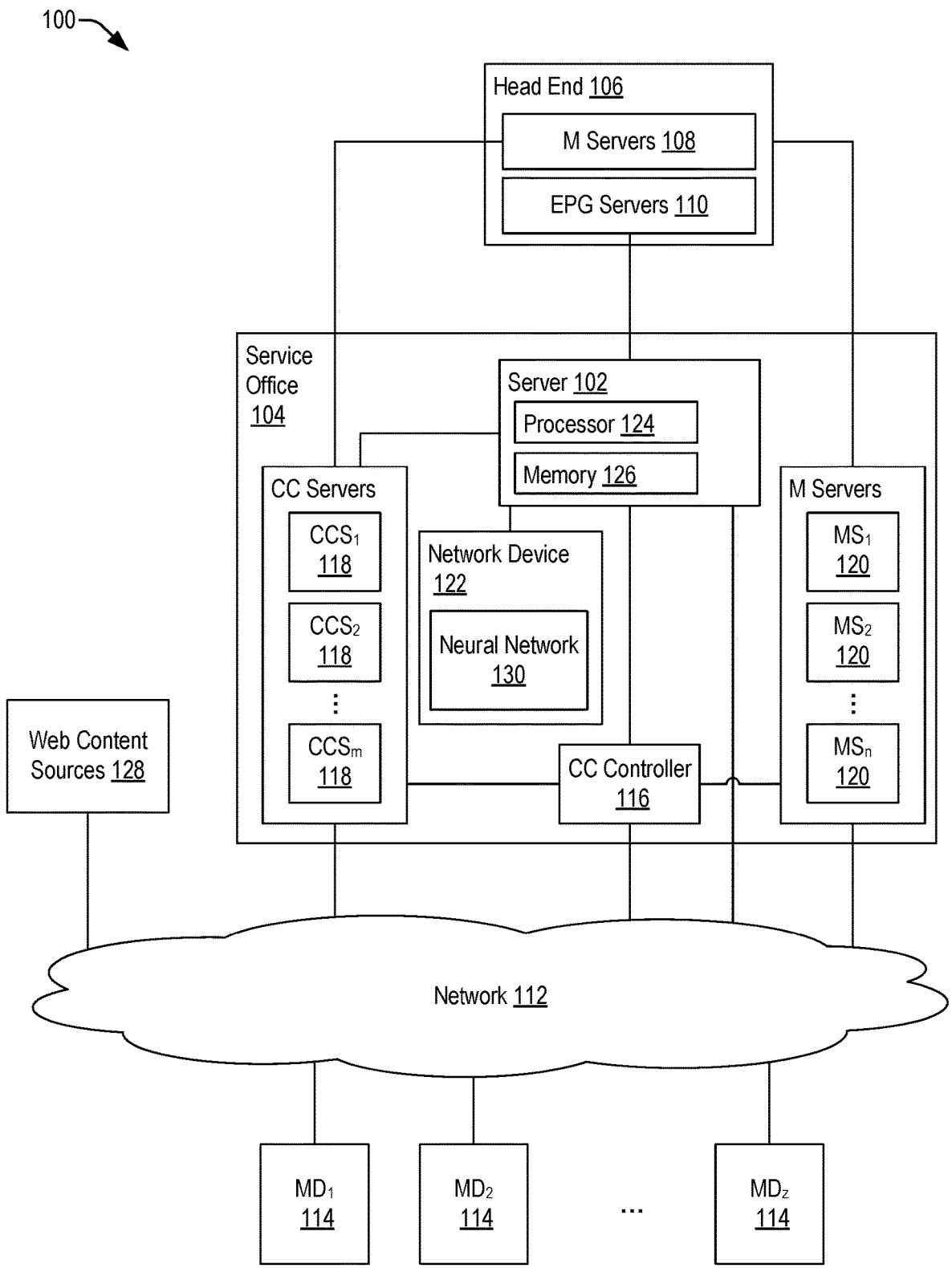
FIG. 1 is a block diagram of a media content distribution system that enables channel change server allocation by a server of a service office.

Systems and methods disclosed herein enable allocation of active channel change servers at a service office of a media content distribution system to handle channel change requests from media devices serviced by the service office. The media content distribution system may be a portion of an internet protocol television system, a cable television system, a satellite television system, or combinations thereof. The allocation may be performed by a server of the service office. Allocating the active channel change servers with the server may enable a particular number of active channel change servers to be available for a period of time automatically (e.g., without receiving operator input of the particular number of active channel change servers for the period of time). Allocating an active channel change server may include introducing the channel change server into service to provide channel change data streaming (e.g., power-up the channel change server). The channel change server may go from being powered off or idle to being active.

Historical data associated with received channel requests may be collected. Each entry of the historical data may include an aggregate number of channel change requests that occurred during a time period, a time at the end of the time period, temporal information (e.g., day, week, month, and year that includes the time period), data corresponding to channel change bias factors associated with the time period, other information, or combinations thereof. A network device of the service office may use the historical data to predict an estimated number of active channel change servers needed to handle channel change requests at a future time. The service office may have the estimated number of active channel change servers active at the future time instead of having active a particular number of channel change servers specified in user input received from an operator associated with the service office.

Each active channel change server may concurrently service a particular number of media devices. Providing too many active channel change servers during a time period may waste resources. Not providing enough active channel change servers during the time period may result in a degradation of service for some subscribers (i.e., a time needed to provide a requested channel may be over one second for a number of media devices serviced by a channel change controller associated with too few active channel change servers). A lag time associated with activating a channel change server (e.g., changing an idle channel change server to an active channel change server) may inhibit a quick solution to the degradation of service.

Allocating the active channel change servers with the server may accommodate a dynamic nature of channel change requests received at the service office. Allocating the channel change servers with the server may enable accommodation of changes associated with received channel requests at a greater frequency than practical using operator input to control allocation of channel change servers. The use of the server may result in more efficient utilization of available channel change servers. The use of the server may avoid waste due to over allocation of active channel change servers and may avoid service degradation due to under allocation of active channel change servers.

In an illustrative embodiment, a method includes determining, at a server, channel change bias factors associated with a time slot. The method includes sending, from the server to a network device, a request for channel change server data. The request includes the time slot and data corresponding to the channel change bias factors. The method includes receiving, at the server, the channel change server data, where the channel change server data identifies a set of times during the time slot and an estimated number of active channel change servers of a plurality of channel change servers for each time of the set of times. The method also includes, before a particular time indicated in the set of times and in response to a current number of active channel change servers being different than the estimated number of active channel change servers for the particular time, adjusting, via the server, the number of active channel change servers of the plurality of channel change servers to match the estimated number of active channel change servers.

In an illustrative embodiment, a system includes channel change servers, a neural network, and a server coupled to the channel change servers and the neural network. The server includes a processor coupled to a memory. The memory stores instructions executable by the processor to perform operations. The operations include determining channel change bias factors associated with a time slot. The operations include sending a request for channel change server data to the neural network. The request includes the time slot and data corresponding to the channel change bias factors. The operations include receiving the channel change server data responsive to the request from the neural network. The channel change server data identifies a set of times during the time slot and an estimated number of active channel change servers for each time of the set of times. The operations also include, before a particular time indicated in the set of times and in response to a number of active channel change servers being different than the estimated number of active channel change servers for the particular time, adjusting a number of active channel change servers of the channel change servers to the estimated number of active channel change servers.

In an illustrative embodiment, a computer-readable device stores instructions, that when executed by a processor, cause the processor to perform operations. The operations include determining channel change bias factors associated with a time slot. The operations include sending a request for channel change server data to a network device. The request includes the time slot and data corresponding to the channel change bias factors. The operations include receiving the channel change server data responsive to the request from the network device. The channel change server data identifies a set of times during the time slot and an estimated number of active channel change servers of a plurality of channel change servers for each time of the set of times. The operations also include, before a particular time indicated in the set of times and in response to a number of active channel change servers being different than the estimated number of active channel change servers for the particular time, adjusting the number of active channel change servers of the channel change servers to match the estimated number of active channel change servers.

FIG. 1 is a block diagram that illustrates a particular embodiment of a media content distribution system 100 that enables channel change server allocation by a server 102 of a service office 104. The media content distribution system 100 may be associated with a service provider that provides one or more services to subscribers. The services may include, but are not limited to, providing access to television programming, media-on-demand content, pay-per-view content, or combinations thereof; receiving and sending information via the internet or other networks; enabling use of communication devices (e.g., telephones and mobile communication devices) via one or more communication networks (e.g., wired telephone networks, mobile communication networks, or both); and combinations thereof. For example, the media content distribution system 100 may be a portion of a television system.

The media content distribution system 100 may include a head end 106 that provides media content to a plurality of service offices, such as the service office 104. The head end 102 may include a plurality of media servers 108 and one or more electronic program guide (EPG) servers 110. A media server may be referred to as an M server or an acquisition server (A-server). The media servers 108 may provide media content to the plurality of service offices. The plurality of service offices may provide the media content to media devices that requested the media content. The service offices may provide the media content via a network 112. For example, the media servers 108 may provide media content to the service office 104. The service office 104 may provide, via the network 112, the media content to one or more media devices 114 that requested the media content.

Media content available from the head end 106 may be provided as channels. The one or more EPG servers 110 may provide information about particular media content available via a particular channel at a particular time. The EPG servers 110 may provide the information to the media devices 114 via a channel sent by the media servers 108 and may also provide the information to the plurality of service offices.

The service office 104 may include a channel change controller 116, channel change servers 118, media servers 120, the server 102, and a network device 122. The channel change controller 116 may receive channel change requests from the media devices 114 via the network 112. A channel change request may identify a media device making the channel change request (e.g., $MD_2$ 114 of $MD_1$ 114-$MD_z$ 114), may identify a current channel, may identify a new channel, or a combination thereof. The channel change request may include a null value for the current channel when $MD_2$ 114 is not presently receiving a current channel. In response to the channel change request, the channel change controller 116 may send a channel change command to an active channel change server (e.g., $CCS_1$ 118 of $CCS_1$ 118 through $CCS_m$ 118). The channel change command may identify the new channel and $MD_2$ 114. In response to the channel change command, $CCS_1$ 118 may send fast channel change data (e.g., one or more bursts of data corresponding to the new channel) to $MD_2$ 114 via the network 112 to reduce a time to fill a buffer of $MD_2$ 114 with media content corresponding to the new channel. Reducing the time to fill the buffer may reduce a time before $MD_2$ 114 can output the new channel.

In response to the channel change request from $MD_2$ 114, the channel change controller 116 may send a leave command to a first media server (e.g., $MS_1$ 120 of $MS_1$ 120 through $MS_n$ 120) that provides the current channel to $MD_2$ 114 when a value for the current channel is not a null value. The leave command may identify $MD_2$ 114 and the current channel. $MS_1$ 120 may stop sending the current channel to $MD_2$ 114 in response to the leave command. When the value for the current channel is the null value, the channel change controller 116 does not send a leave command associated with the channel request received from $MD_2$ 114. When $MD_2$ 114 was the only media device of the media devices 114 receiving the current channel from $MS_1$ 120, $MS_1$ 120 may send a leave command to the head end 106 to stop receiving the current channel and may notify the channel change controller 116 that $MS_1$ 120 is not receiving the current channel.

The channel change controller 116 may determine whether a second media server of the media servers 120 is available to send the new channel to $MD_2$ 114. For example, the second media server may be identified as available if the second media server has bandwidth capacity to send the new channel to $MD_2$ 114 and is receiving the new channel. The second media server may be $MS_1$ 120 or another media server of the media servers 120. When the channel change controller 116 determines that the second media server (e.g., $MS_3$ 120) is available, the channel change controller 116 may send a join command to $MS_3$ 120. The join command may specify MD$_2$ 114 and the new channel. In response to the join command, MS$_3$ 120 may send the new channel to MD$_2$ 114 via the network 112.

In response to the channel change server 116 determining that the second media server does is not available, the channel change server 116 may send a join command to a third media server (e.g., MS$_1$ 120 or another media server of the media servers 120) that has bandwidth capacity to send the particular channel to MD$_2$ 114. The join command may identify the new channel and MD$_2$ 114. In response to the join command, MS$_1$ 120 may send a second join command to the head end 106 and may receive the new channel in response to the second join command. MS$_1$ 120 may then send the new channel to MD$_2$ 114 via the network 112.

The server 102 may allocate active channel change servers of the channel change servers 118. The server 102 may be a stand-alone device or may be a component of the channel change controller 116, the network device 122, or both. The server 102 may maintain a list of active channel change servers. Active channel change servers receive each channel available from the head end 106 from the media servers 108. At certain times based on channel change server data from the network device 122, the server 102 may idle (e.g., place in a low-power state) one or more active channel change servers or may activate (e.g., power-up) one or more idle channel change servers.

To idle an active channel change server (e.g., CCS$_5$ 118), the server 102 may send an idle notification that identifies CCS$_5$ 118 to the channel change controller 116. In response to the idle notification, the channel change controller 116 may stop sending channel change commands to CCS$_5$ 118. The server 102 also sends an idle command to CCS$_5$ 118. In response to the idle command, CCS$_5$ 118 may complete any pending channel change commands received from the channel change controller 116 and may send leave messages to the head end 106 to stop receiving media content from the head end 106. The server 102 may change the list of active channel change servers to remove CCS$_5$ 118.

To activate an idle channel change server (e.g., CCS$_3$ 118), the server 102 may send an activate command to CCS$_3$ 118. In response to the activate command, CCS$_3$ 118 may send join commands to the head end 106 for each channel available from the head end 106. In response to the join commands, CCS$_3$ 118 receives and buffers corresponding media content. Activating CCS$_3$ 118 may take a particular amount of time (e.g., less than 1 minute, less than 3 minutes, less than 5 minutes, or some other amount of time). The particular amount of time may be a lag time associated with the media content distribution system 100. After the lag time, the server 102 may send an activation notice to the channel change controller 116. The activation notice may inform the channel change controller 116 that CCS$_3$ 118 is active and can receive channel change commands from the channel change controller 116. The server 102 may update the active list to include CCS$_3$ 118.

The server 102 may include a processor 124 and a memory 126. The memory 126 may include instructions executable by the processor 124 to perform operations. The operations may include determining an upcoming time slot, determining channel change bias factors associated with the time slot, sending a request to the network device 122 for channel change server data, receiving the channel change server data in response to the request, and allocating active channel change servers based on the channel change server data at one or more times indicated in the channel change server data. The request may identify the time slot and include information corresponding to the channel change bias factors.

The time slot may be may be an hour, a plurality of hours, a day, a week, a month, or some other time period. When the time slot is less than a day, a length of the time slot may vary. The time slot may be a plurality of hours for times that are likely to have few channel changes and may be an hour for time slots that are likely to have many channel changes. For example, use of the media content distribution system 100 during a weekday afternoon may be low, and a time slot for a weekday afternoon may correspond to a time from 12 pm to 4 p.m. As another example, use of the media content distribution system 100 during a weekday evening may be high, and time slot may be one hour intervals during the evening (e.g., 6 pm to 7 pm, 7 pm to 8 pm, etc.)

The channel change bias factors may be factors that can influence a number of channel change requests during at least a portion of the time slot. The channel change bias factors determined by the server 102 may correspond to channel bias factors for a time corresponding to a beginning of the time slot. The channel change may be subsequently updated during the time slot to accommodate changes to the channel change bias factors. The channel change bias factors may include temporal bias factors and media content bias factors. The temporal bias factors may be determined based on the time slot, may be determined from analysis of data retrieved from one or more web content sources 128, or both. The temporal bias factors may include, but are not limited to, a month identifier of a month that includes the time slot, a weekday identifier of a day that includes the time slot, a week identifier of a week in a year, a holiday identifier of a holiday associated with the day, weather data associated with the time slot, news data associated with the time slot, or combinations thereof.

For example, the server 102 may query the one or more web content sources 128 to determine holidays during a year and may analyze query information received in response to the query to determine particular days associated with holidays during the year that can influence channel changes (e.g., New Year's Day, Easter, Independence Day, Christmas Day, Thanksgiving Day, etc. in the U.S.A.). The server 102 may store the query information in the memory 126 for subsequent retrieval and use. The server 102 may determine if a day associated with the time slot corresponds to one of the holidays in the query information. As another example, the server 102 may receive weather warnings and weather alerts from one or more web content sources 128 (e.g., the National Weather Service). The server 102 may generate data corresponding to temporal bias factors when pending weather warnings or weather alerts are applicable to areas serviced by the service office 104.

The server 102 may receive EPG information from the EPG servers 110 of the head end 106. The server 102 may analyze the information to determine media content bias factors associated with available media content. The media content bias factors may include, but are not limited to, whether the media content includes one or more season premieres, whether the media content includes one or more season finales, whether the media content includes new programs or only reruns, factors associated with one or more sport programs during the time slot, or combinations thereof. The factors may include, but are not limited to, type of sport associated with the sport program, whether the sport program is likely to be of special interest in an area serviced by the channel change controller, whether the sport program is a regular season game or a special game, other factors associated with the sport program that may influence a number of channel change requests, or combinations thereof.

The server 102 may send the request for channel change server data to the network device 122. The request may identify the time slot and data corresponding to the channel change bias factors. The network device 122 may return the channel change server data in response to the request. The channel change server data may specify a set of times during the time interval and a number of estimated active channel change servers for each time of the time set. The estimated channel change servers corresponds to a number of active channel change servers needed to service a number of channel change requests predicted to be received.

The server 102 and the network device 122 may take into consideration a lag time needed to accommodate activating an idle channel change server. For example, the server 102 may send the request for channel change server data at a first time before a beginning of the time slot, where the first time is equal or greater than the lag time.

As another example, the network device 122 may estimate that 5 active channel change servers are needed from 8:00 pm to 8:04 pm on a particular day, may estimate that 1 active channel change server is needed from 8:04 pm to 8:06 pm, may estimate that 3 active channel change servers are needed from 8:06 to 8:17, and may estimate that 2 channel change servers are needed until 8:25 pm. Table 1 depicts a portion of the channel change server data that may be returned to the server 102 by the network device 122 in response to the request for channel change server data. The channel change server data may include a first time of 8:00 pm and may indicate that 5 channel change servers are needed. The channel change server data may include a second time of 8:04 pm and may indicate that 3 servers are needed. The channel change server data may indicate that 3 servers are needed at 8:04 instead of 1 server because there would be insufficient time to activate 2 idle servers in the 2 minutes between 8:04 pm and 8:06 pm when the lag time is over 2 minutes. The channel change server data may include entries at 8:09 and 8:14 that are unchanged from the entry at 8:04. The 8:09 and 8:14 entries may be included so that the server 102 determines whether changes to the channel change bias factors have occurred. When changes have occurred, the server 102 may update the data corresponding to the updated channel change bias factors and may send a second request to the network device 122 to update the channel change server data.

TABLE 1

| Time | Estimated number of servers |
|---|---|
| 8:00 | 5 |
| 8:04 | 3 |
| 8:09 | 3 |
| 8:14 | 3 |
| 8:17 | 2 |

The network device 122 may include one or more algorithms to determine the channel change server data. In some embodiment, all or portions of the one or more algorithms may be implemented via a neural network 130. The neural network 130 may be trained using historical data. The historical data may include a number of channel change requests received by the channel change controller 116 in a time period, a time corresponding to the end of the time period, and channel change bias factors for the time period. A length of the time period may be sufficient to enable determination of estimated active channel change servers needed to avoid degradation of service provided by the media content distribution system 100. Degradation may occur when a channel change request is not completed within a threshold time period (e.g., one second). For times when channel change requests are likely to result in a change in the number of estimated active channel change servers, a granularity of the time period may be small (e.g., 0.5 seconds, 1 second, or some other time). For times when channel change request are not likely to result in a change in the number of estimated active channel change servers, the granularity may be larger (e.g., 5 seconds, 30 seconds, 1 minute, or some other time).

The server 102 may provide the historical data to the network device 122. The network device 122 may provide an input vector including the historical data to the neural network 130. Nodes of the neural network 130 may apply biases and/or weighting factor to portions of the input vector and calculate an estimated number of active channel change servers based on temporal factors and the data corresponding to the channel change bias factors. The estimated number of active channel change servers is compared to a calculated value of an actual number of active channel change servers needed to process the number of channel change requests indicated in the training data. When the comparison for many input vectors indicates that the estimated number is correct (e.g., the estimated value equal to the calculated value or including one extra active channel change server above the calculated value) for a desired percentage of the input vectors (e.g., 95% or more), the neural network 130 may be considered to be trained and may be used to predict future channel change server needs. Additional training data may be provided to the neural network 130 after the neural network 130 is trained so that the neural network 130 remains trained.

When the comparison by the neural network 130 for many input vectors indicates that the estimated number is not correct (e.g., the estimated number is less than the calculated value or includes two or more extra active channel change servers above the calculated value) for a percentage of the input vectors (e.g., 5% or more), the weighting values or biases associated with one or more nodes of the neural network 130 may be adjusted or other remedial action may be taken so that the neural network 130 provides desired output.

When the neural network 130 is trained, the neural network 130 may be used to provide channel change server data to the server 102. The neural network may receive a time slot, temporal data associated with the time slot, and data corresponding to channel change bias factors for the time slot. The neural network may output channel change server data to the server 102.

When the server 102 receives channel change server data from the network device 122, the server 102 may determine from the channel change server data a particular time in a set of times that is next to occur and a corresponding number of estimated channel change servers. At a first time before the particular time, the server 102 may determine a current number of active channel change servers and may compare the current number to the number of estimated channel change servers. The current number may be determined by counting a number of entries in the active channel change server list. When the current number is different than the estimated number of channel change servers, the server 102 may adjust the number of active channel change servers to the estimated number of channel change servers.

For example, when the current number is more than the estimated number of channel change servers, the server 102 may idle a first particular number of active channel change servers; and when the current number is less than the estimated number of channel change servers, the server may activate a second particular number of channel change servers. The first particular number may be the difference between the current number and the estimated number of channel change servers, and the second particular number may be the difference between estimated number of channel change servers and the current number.

After adjusting the number of active channel change servers to the estimated number of channel change servers, or when the estimated number of channel change servers equals the current number, the server 102 may determine whether changes occurred to the channel change bias factors. When changes occurred, the server 102 may update the time slot and the data corresponding to the channel change bias factors and send another request for channel change server data to the network device 122. The network device 122 may return the channel change servers data to the server 102 and the server 102 may use the channel change server data for channel change server allocation for one or more upcoming times indicated in the channel change server data.

Thus, the server 102 of FIG. 1 enables channel change server allocation during a time slot for the service office 104 of the media content distribution system 100. The use of the server 102 may result in more efficient utilization of available channel change servers 118. The use of the server 102 may avoid waste due to over allocation of active channel change servers and may avoid service degradation due to under allocation of active channel change servers.

Figure 2:
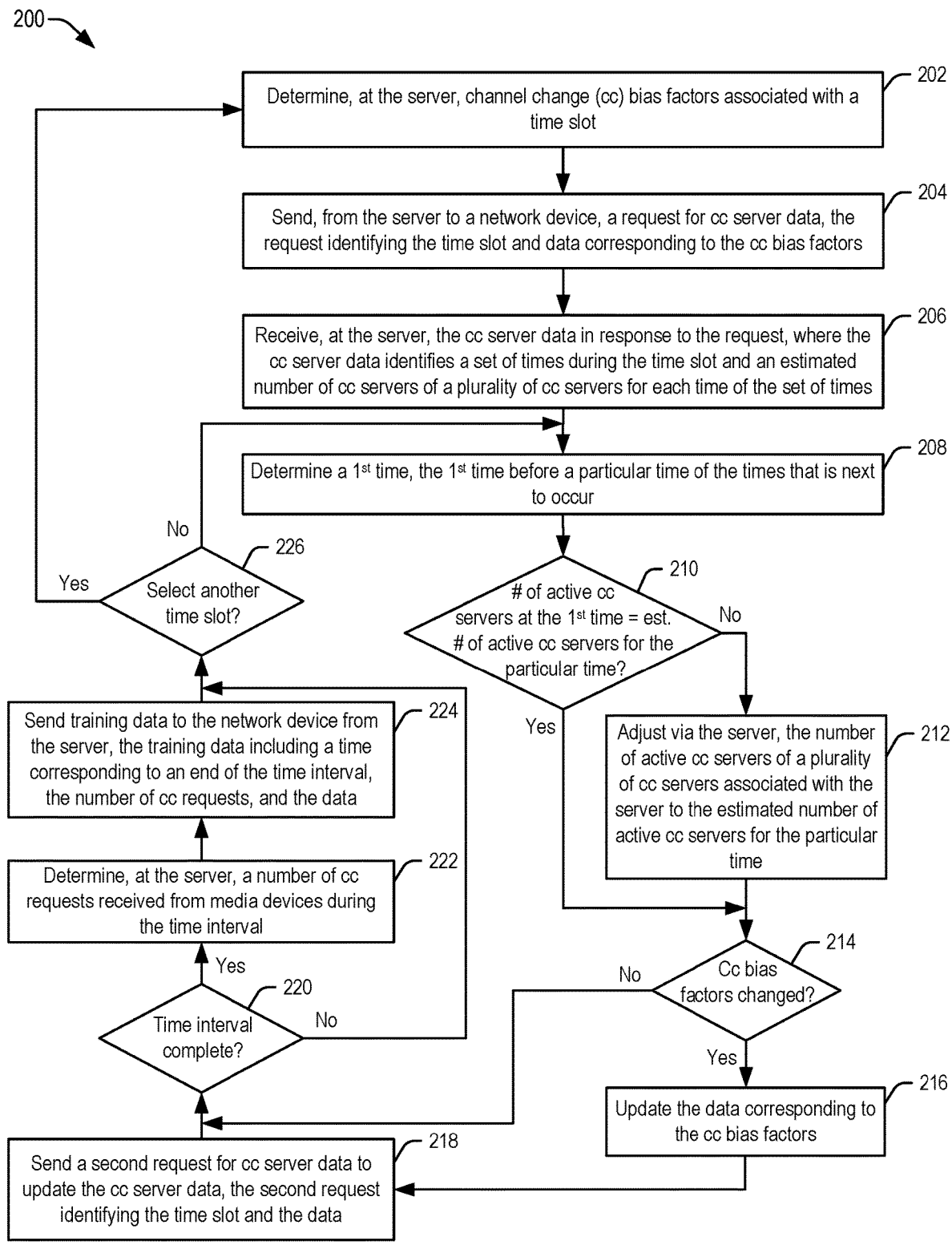
FIG. 2 is a flowchart of a first embodiment of a method of channel change server allocation.

Referring to FIG. 2, a flowchart of an embodiment of a method 200 for allocating channel change servers is shown. The method 200 may be performed by a server of a service office of a media content distribution system (e.g., the server 102 of FIG. 1). The media content distribution system may provide media content to media devices associated with subscribers. The media content distribution network may be associated with a service provider. The media content may include television content organized by channels. The server may determine channel change bias factors associated with a time slot, at 202. The time slot may be associated with a time period for which the server is to provide channel change server allocation information. The time slot may be associated with an upcoming day or portion of a day when the server is to use the channel change server allocation information to adjust a number of active channel change servers. The time slot may be user input when the channel change server allocation information is to be provided as output to be reviewed by personnel associated with the service office. The time slot may be an hour in a day, a plurality of hours in the day, the day, a week, a month, or some other time period.

The channel change bias factors may be determined by analyzing electronic program guides, weather alerts provided by the National Weather Service, data from web sources, or combinations thereof. The channel change bias factors may include temporal bias factors associated with the time slot. The temporal bias factors may include, but are not limited to, a month identifier of a month that includes the time slot, a weekday identifier of a day that includes the time slot, a week identifier of a week in a year, a holiday identifier of a holiday associated with the day, weather data associated with the time slot, news data associated with the time slot, or combinations thereof. The weather data may be associated with local weather alerts and weather warnings, major storm events (e.g., hurricanes and typhoons), or combinations thereof, that can change typical viewing patterns and lead to a significant deviation from a normal number of channel changes during the time slot. The news data may indicate recent events of interest and/or breaking news (e.g., shootings, natural disasters, terrorist attacks, searches for particular people, etc.) that can change typical viewing patterns and lead to a significant deviation from a normal number of channel changes during the time slot.

The channel change bias factors may also include media content bias factors associated with media content available during the time slot. Presence of one or more of the media content bias factors for the time slot may result in significant deviation from a normal number of channel changes during the time slot. The media content bias factors may include, but are not limited to, whether the media content includes one or more season premieres, whether the media content includes one or more season finales, whether the media content includes new programs or only reruns, factors associated with one or more sport programs during the time slot, or combinations thereof.

The factors associated with a sport program may include, but are not limited to type of sport associated with the sport program, whether the sport program is likely to be of interest in a region serviced by the server, whether the sport program is a regular season game or a special game, other factors associated with the sport program that may influence a number of channel change requests, or combinations thereof. A sport program may be of interest in the region when the sport program includes a team associated with the region serviced by the server. For example, the sport program may be a college football game and the game may likely be of interest to subscribers in regions that are home towns to the colleges in the football game. A special game may be a playoff game, a championship game, a playoff game, the Olympics, etc.

The server may send, to a network device, a request for channel change server data, at 204. The request may identify the time slot and data corresponding to the channel change bias factors.

The network device may include a neural network trained using historical data provided to the neural network by the server or another network device. Providing the training data may include dividing each day into a number of time intervals. For each time interval, the historical data includes a time corresponding to an end of the time interval, a number of channel change requests receive during the time interval, and channel change bias factors associated with the time interval. Granularity of the time intervals may be sufficient to enable determination of estimated number of active channel change servers needed to inhibit degradation of service that noticeably delays channel changes for one or more subscribers (e.g., a channel change takes longer than about one second during when the service is degraded). In some embodiments, the time intervals may each be a particular time (e.g., 0.5 seconds, 1 second, or some other time). In other embodiments, the granularity of the time intervals may vary. For example, at times when there are typically a large number of channel changes (e.g., during prime viewing hours, near hour changes, near 30 minutes after an hour, near times when advertisements typically occur, etc.), the granularity of the time intervals may be small (e.g., 0.5 seconds, 1 second, or some other time). At other times when a number of channel changes is typically low (e.g., between typical times for advertisements, during early morning hours, during early afternoon hours of an ordinary weekday, etc.), the granularity of the time intervals may be larger (e.g., 5, seconds, 30 seconds, 1 minute, or some other time).

The network device may send a notification to an operator of the service office when the estimated number of active channel change servers exceeds a threshold number of channel change servers. The notification may indicate the time slot, the particular time in the time slot, channel change bias factors that are applicable, the number of estimated active channel change servers, a second number of estimated active channel change servers without one or more of the channel change bias factors, other information, or combinations thereof. For example, news events and weather events have potential to cause large changes in channel change requests. Instead of relying on historical responses when weather bias factors and/or news bias factors are applicable, the neural network may automatically increase the estimated number of active channel change servers to a large number above the threshold number so that the service office is able to handle a larger number of channel changes. The network device may send the notification to the operator. The operator may determine whether to manually override an allocation of the channel change servers.

The server may receive the channel change server data in response to the request, at 206. The channel change server data may identify a set of times during the interval and an estimated number of active channel change servers of a plurality of channel change servers for each time of the set of times.

The server may determine a first time, where the first time corresponds to a time before a particular time of the set of times that is next to occur, at 208. A difference between the particular time and the first time may correspond to a lag time associated with changing an idle channel change server to an active channel change server. For example, the first time may be the particular time less the lag time and less 0.1 seconds. Other ways of determining the first time may be employed. The server may determine whether a current number of active channel change servers at the first time equals the estimated number of active channel change servers for the particular time, at 210. When the current number of active channel change servers does not equal the estimated number of active channel change servers at the particular time, a number of active channel change servers of the plurality of channel change servers may be adjusted via the server to the estimated number of active channel change servers at the particular time, at 212.

In response to the current number of active channel change servers being less than the estimated number of active channel change servers at the particular time, adjusting the number of active channel change servers may include activating a first number of idle channel change servers of the plurality of channel change servers. The first number may be equal to a difference between the estimated number of active channel change servers at the particular time and the current number of active channel change servers. Activating an idle channel change server may take a first period of time. Activating a first channel change server of the first number of idle channel change servers may include, before the particular time less the first period of time, sending an activation command from the server to the first channel change server. In response to the activation command, the first channel change server may send a join command for each channel available from the media content distribution network and the first channel change server may buffer received media content for each channel in separate buffers. At the particular time, the server may send to a channel change controller an active message. The active message may identify each channel change server of the first number of channel change servers as an active channel change server. The channel change controller may utilize each channel change server identified as an active channel change server to send fast channel change data for requested channels to media devices in response to channel change requests from media devices.

In response to the current number of active channel change servers being more than the estimated number of active channel change servers at the particular time, adjusting the number of active servers may include idling a second number of active channel change servers of the plurality of channel change servers. The second number may be equal to a difference between the current number of active channel change servers and the estimated number of active channel change servers for the particular time. Idling a first channel change server of the second number of active channel change servers may include sending an idle command from the server to the first channel change server at or near the particular time. In response to the idle command, the first channel change server completes pending fast channel change data transmissions and sends a leave command for each channel received from the media content distribution system. The first channel change server may transition to a low-power state. At the particular time, the server may send an idle message to the channel control controller. The idle message may identify each channel change server of the second number of channel change servers as an idle channel change server. The channel change controller does not utilize channel change servers identified as idle channel change servers.

When the number of active channel change servers at the first time equals the estimated number of active channel change servers for the particular time, at 210, or after adjusting the number of active channel change servers to the estimated number of active channel change servers for the particular time, a determination may be made whether the channel change bias factors changed, at 214. When the channel change bias factors changed, the server may update data corresponding to the bias factors, at 216. The server may send to the network device a second request for channel change server data to update the channel change server data, at 218.

When the bias factors are not changed, at 214, or after updating the channel change server data, at 218, the server may determine whether a time interval is complete, at 220. The time interval may be a time interval associated with training data for the neural network of the network device. When the time interval is complete, the server may determine a number of channel change requests received from the media devices during the time interval, at 222. The determination may be made by requesting information from the channel change controller. Alternately, the channel change controller may forward channel change requests to the server, and the server may include a counter that counts the channel change requests. The server may determine the number of channel change requests received during the time interval from the counter. The server may send training data to the network device, at 224. The training data may include a time corresponding to an end of the time interval, the number of channel change requests, and the data corresponding to the bias factors.

The server may determine whether to select another time slot, at 226. The server may determine whether the set of times includes another time. When the set of times does not include another time, the method 200 may return to 202 and channel change bias factors for another time slot may be determined. When the set of times includes another time, the method 200 may return to 208, and the server may determine a first time, the first time before a particular time of the times that is next to occur.

Thus, the method 200 of FIG. 2 enables channel change server allocation by the server. The channel change server allocation may result in efficient use of available channel change servers. The channel change server allocation may avoid waste due to over allocation of active channel change servers and may avoid service degradation due to under allocation of channel change servers.

Various embodiments disclosed herein describe channel change server allocation by a server of a service office of a media content distribution system. The media content distribution system may be an internet protocol television system. a cable television system, a satellite television system, or combinations thereof. Allocating the active channel change servers with the server may accommodate a dynamic nature of channel change requests received at the service office. Allocating the channel change servers with the server may enable accommodation of changes associated with received channel requests at a greater frequency than practical using operator input to control allocation of channel change servers. The use of the server may result in more efficient utilization of available channel change servers. The use of the server may avoid waste due to over allocation of active channel change servers and may avoid service degradation due to under allocation of active channel change servers.

Figure 3:
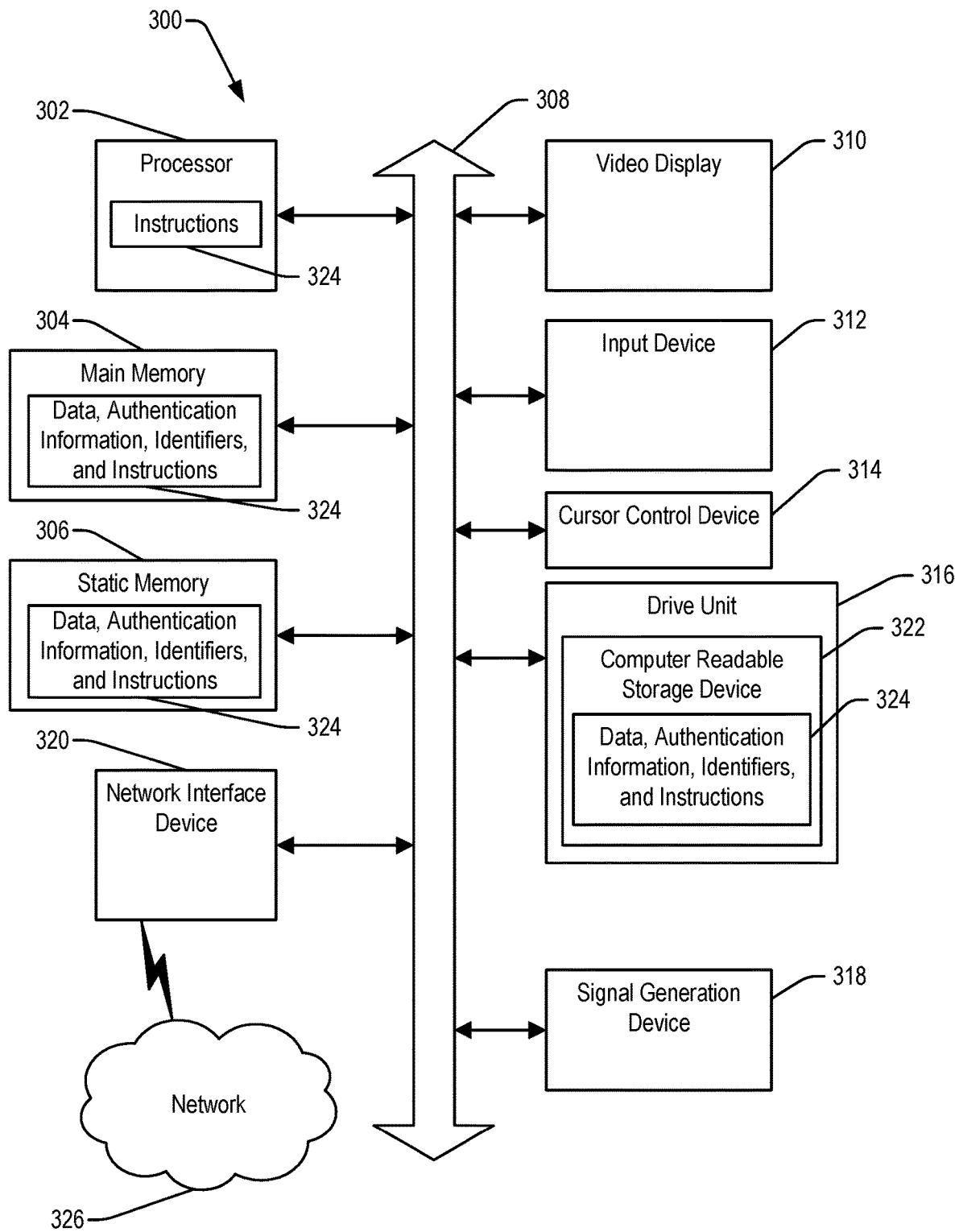
FIG. 3 is a block diagram of an illustrative embodiment of a general computer system.

Referring to FIG. 3, an illustrative embodiment of a general computer system is shown and is designated 300. The computer system 300 includes a set of instructions (e.g., the instructions 324 in the memory 304) that can be executed to cause the computer system 300 to perform any one or more of the methods or computer based functions disclosed herein. The computer system 300 may operate as a stand-alone device or may be connected (e.g., using a network) to other computer systems or peripheral devices. For example, the computer system 300 may include or may be included within any one or more of the server 102, the media servers 108, the EPG servers 110, the media devices 114, the channel change controller 116, the channel change servers 118, the media servers 120, the network device 122, the web content sources 128, or combinations thereof described with reference to FIG. 1.

In a networked deployment, the computer system 300 may operate in the capacity of a server or as a client user computer in a server-client user network environment, or as a peer computer system in a peer-to-peer (or distributed) network environment. The computer system 300 may also be implemented as or incorporated into various devices, such as a server, a network device, a mobile device, a palmtop computer, a laptop computer, a desktop computer, a communications device, a wireless telephone, a personal computer (PC), a tablet PC, a personal digital assistant (PDA), a set-top box (STB) device, a media playback device, a customer premises equipment device, an endpoint device, a web appliance, or any other machine capable of executing a set of instructions (sequential or otherwise) that specify actions to be taken by that machine. In a particular embodiment, the computer system 300 may be implemented using electronic devices that provide video, audio, data communication, or combinations thereof. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302 (e.g., a central processing unit (CPU), a graphics processing unit (GPU), or both). Moreover, the computer system 300 may include a main memory 304 and a static memory 306, which can communicate with each other via a bus 308. As shown, the computer system 300 may further include a video display unit 310, such as a liquid crystal display (LCD), a light emitting diode (LED) display, a touch screen display, a flat panel display, a solid state display, or a lamp assembly of a projection system. Additionally, the computer system 300 may include an input device 312, such as a remote control device (e.g., a television remote or a set-top box remote), a keyboard, a joystick, another type of input device, or combinations thereof. In addition, the computer system 300 may include a cursor control device 314 (e.g., a mouse). In some embodiments, the input device 312 and the cursor control device 314 may be integrated into a single device, such as a capacitive touch screen input device. The computer system 300 may also include a drive unit 316, a signal generation device 318, such as a speaker or remote control, and a network interface device 320. Some computer systems 300 may not include an input device (e.g., a server may not include an input device).

In a particular embodiment, as depicted in FIG. 3, the drive unit 316 may include a computer-readable storage device 322 in which data, authentication information, identifiers, and one or more sets of instructions 324, e.g. software, can be embedded. The computer-readable storage device 322 may be random access memory (RAM), read-only memory (ROM), programmable read-only memory (PROM), erasable PROM (EPROM), electrically erasable PROM (EEPROM), one or more registers, solid-state memory, one or more hard disks, one or more removable disks, compact disc read-only memory (CD-ROM), other optical disk storage, magnetic disk storage, magnetic storage devices, or any other storage device usable to store program code in the form of instructions or data and that can be accessed by a computer and/or a processor. A computer-readable storage device is not a signal.

Further, the instructions 324 may embody one or more of the methods or logic as described herein. The instructions 324 may be executable by the processor 302 to perform one or more functions or methods described herein, such as the method 200 described with reference to FIG. 2. In a particular embodiment, data (e.g., information corresponding to channel change requests received by a service office in a particular period of time), authentication information, identifiers, and instructions (e.g., instructions to allocate active channel change servers) 324 may reside completely, or at least partially, within the main memory 304, the static memory 306, and/or within the processor 302 during execution by the computer system 300. The main memory 304 and the processor 302 also may include a computer-readable storage device. The authentication information included in the authentication information, identifiers, and instructions 324 in the drive unit 316, the main memory 304, the static memory 306, the processor 302, or combinations thereof may be transmitted to another computer system to enable authentication of the computer system 300, and the identifiers may include a list of identifiers used to authenticate the other computer system, prior to sharing a resource with the other computer system.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality described herein. It is further noted that a computing device, such as a processor, a controller, a state machine or other suitable device for executing instructions to perform operations may perform such operations directly or indirectly by way of one or more intermediate devices directed by the computing device.

The computer system 300 may communicate with one or more external systems via a network 326. First data stored by the computer-readable storage device 322 may be sent to the one or more external systems via the network 326. Also, second data may be received by the computer system 300 via the network 326. The second data may be stored by the processor 324 to the computer-readable storage device. Additionally, while the computer-readable storage device 322 is shown to be a single device, the computer-readable storage device 322 may be a single device or may be multiple devices, such as a centralized or distributed database, and/or associated caches and servers that store one or more sets of instructions. The computer-readable storage device 322 is capable of storing a set of instructions for execution by the processor 302 to cause the computer system 300 to perform any one or more of the methods or operations disclosed herein.

In a particular non-limiting, exemplary embodiment, the computer-readable storage device 322 may include a solid-state memory such as embedded memory (or a memory card or other package that houses one or more non-volatile read-only memories). Further, the computer-readable storage device 322 may include a random access memory or other volatile re-writable memory. Additionally, the computer-readable storage device 322 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for short-range communications and long-range communications can be used by the computer system 300 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   sending, from a server to a network device, a request for channel change server data, the request identifying a time slot;
   receiving, at the server, the channel change server data from the network device responsive to the request, wherein the channel change server data identifies a set of times during the time slot and an estimated number of active channel change servers for each time of the set of times; and
   in response to a first particular estimated number for a first particular time of the set of times indicating to increase a number of active channel change servers, sending an activation command from the server to a first idle channel change server at a first time before the first particular time, wherein the activation command instructs the first idle channel change server to transition to an active channel change server.

2. The method of claim 1, further comprising, in response to a second particular estimated number for a second particular time of the set of times indicating to decrease the number of active channel change servers and at or near the second particular time, sending, from the server to a first active channel change server, an idle command, wherein the idle command instructs the first active channel change server to transition to an idle channel change server.

3. The method of claim 2, further comprising, in response to the second particular estimated number indicating to decrease the number of active channel change servers, sending an idle message at the second particular time to a controller, wherein the idle message informs the controller not to use the first active channel change server to implement channel change requests received at the controller from user devices.

4. The method of claim 3, wherein the idle message includes an identifier of each channel change server idled in response to the second particular estimated number indicating to idle more than one active channel change server.

5. The method of claim 1, further comprising sending an activation message from the server to a controller at the first particular time, wherein the activation message informs the controller to use the active channel change server to implement channel change requests received at the controller from user devices.

6. The method of claim 5, wherein the activation message includes an identifier of each channel change server activated in response to the first particular estimated number indicating to activate more than one idle channel change server.

7. The method of claim 1, wherein the request further includes data corresponding to channel change bias factors associated with the time slot.

8. The method of claim 7, wherein the channel change bias factors include temporal bias factors, media factors associated with media content scheduled during the time slot, or both.

9. The method of claim 8, wherein the data associated with temporal bias factors includes a month identifier, a day of week identifier, a holiday identifier, or combinations thereof.

10. The method of claim 8, wherein the temporal bias factors include news events that lead to additional channel changes, weather events that lead to additional channel changes, or both.

11. The method of claim 8, wherein the server determines the media factors from electronic program data received from a video head end.

12. The method of claim 11, wherein the data associated with the media factors includes times of season premieres and season finales occurring during the time slot, information associated with sports programming during the time slot, times and popularity information associated with new episodes of programming, or combinations thereof.

13. The method of claim 1, wherein the first time is based on a lag time associated with changing a status of a channel change server from idle to active.

14. A system comprising:
   a server coupled to a plurality of channel change servers, the server including a processor coupled to a memory, the memory storing instructions executable by the processor to perform operations including:
   sending a request for channel change server data to a network device, the request identifying a time slot;
   receiving channel change server data from the network device responsive to the request, wherein the channel change server data identifies a set of times during the time slot and an estimated number of active channel change servers for each time of the set of times; and
   in response to a particular estimated number for a particular time of the set of times indicating to decrease a number of active channel change servers and at or near the particular time, sending an idle message to a controller that is configured to receive and implement channel change requests from user devices, wherein the idle message includes an identifier of an active channel change server that the controller is to stop using to process channel change requests.

15. The system of claim 14, wherein the operations further comprise, in response to the particular estimated number indicating to decrease the number of active channel change servers and at or near the particular time, sending an idle command to the active channel change server, wherein the idle command instructs the active channel change server to transition to an idle channel change server.

16. The system of claim 14, wherein the request includes data corresponding to channel change bias factors associated with the time slot.

17. A non-transitory computer-readable storage device storing instructions that, when executed by a processor, cause the processor to perform operations, the operations comprising:
   sending a request for channel change server data to a network device, the request identifying a time slot;
   receiving channel change server from the network device responsive to the request, wherein the channel change server data identifies a set of times during the time slot and an estimated number of active channel change servers for each time of the set of times; and in response to a first particular estimated number for a first particular time of the set of times indicating to decrease a number of active channel change servers and at or near the first particular time, sending an idle command to a first active channel change server, wherein the idle command instructs the first active channel change server to transition to an idle channel change server.

18. The non-transitory computer-readable storage device of claim 17, wherein the operations further include, in response to the first particular estimated number indicating to decrease the number of active channel change servers and at or near the first particular time, sending an idle message to a control server configured to receive and implement channel change requests from user devices, wherein the idle message includes an identifier of the first active channel change server.

19. The non-transitory computer-readable storage device of claim 17, wherein the operations further comprise in response to a second particular estimated number for a second particular time of the set of times indicating to increase a number of active channel change servers, sending, at a first time before the second particular time, an activation command, wherein the activation command instructs a first idle channel change server to transition to an active channel change server.

20. The non-transitory computer-readable storage device of claim 19, wherein the first time is based on a lag time associated with changing a status of a channel change server from idle to active.

* * * * *